United States Patent [19]

Forgensi et al.

[11] 4,076,640
[45] Feb. 28, 1978

[54] PREPARATION OF SPHEROIDIZED PARTICLES

[75] Inventors: Rudolph Forgensi, Webster; Robert J. Hagenbach, Rochester, both of N.Y.

[73] Assignee: Xerox Corporation, Stamford, Conn.

[21] Appl. No.: 552,589

[22] Filed: Feb. 24, 1975

[51] Int. Cl.² .......................... C21C 5/52; H05B 7/18
[52] U.S. Cl. .................... 252/62.1 R; 75/.5 B; 75/10 R; 264/15; 427/127
[58] Field of Search ............. 427/127; 252/62.54, 252/62.1; 75/.5 AA, .5 B, 10 R

[56] References Cited

U.S. PATENT DOCUMENTS

| | | | |
|---|---|---|---|
| 3,239,465 | 3/1966 | Rheinfrank | 252/62.54 X |
| 3,247,014 | 4/1966 | Goldberger et al. | 427/34 |
| 3,417,167 | 12/1968 | Kizer et al. | 264/15 X |
| 3,556,998 | 1/1971 | Steiner | 252/62.54 X |
| 3,558,492 | 1/1971 | Proskow | 252/62.5 X |
| 3,576,672 | 4/1971 | Harris et al. | 427/34 X |
| 3,627,682 | 12/1971 | Hall et al. | 252/62.54 |
| 3,742,585 | 7/1973 | Wentzell | 427/34 X |
| 3,989,512 | 11/1976 | Sayce | 264/15 X |

Primary Examiner—Bernard D. Pianalto

[57] ABSTRACT

A method of manufacturing spheroidized beads comprising the steps of introducing raw ore particles in the presence of an inert non-oxidizing carrier gas to a carbon arc plasma flame assembly to which is fed a controlled amount of oxygen and argon gas, melting the ore particles to form spheroidized droplets thereof, allowing the spheroidized droplets to fall by gravity in a substantially closed chamber having a controlled atmosphere wherein the droplets cool and solidify into beads, and collecting the beads.

8 Claims, 2 Drawing Figures

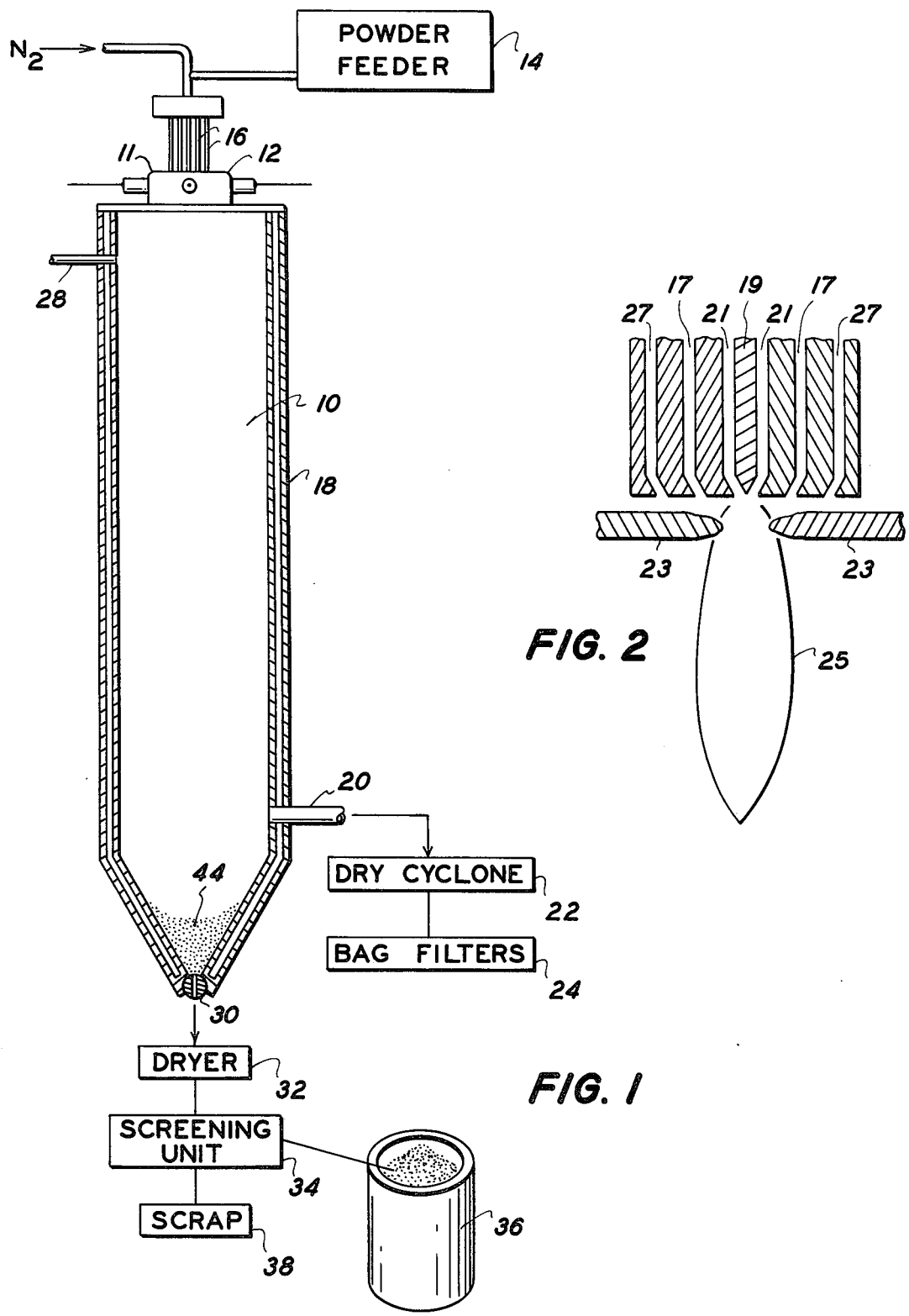

PREPARATION OF SPHEROIDIZED PARTICLES

BACKGROUND OF THE INVENTION

This invention relates in general to electrostatographic imaging systems, and in particular, to improved magnetically attractable developer materials, the process of making them, and their use.

Electrostatographic imaging processes and techniques have been extensively described in both the patent and other literature, for example, U.S. Pat. Nos. 2,221,776, 2,277,013, 2,297,691, 2,357,809, 2,551,582, 2,285,814, 2,833,648, 3,220,324, 3,220,831, 3,220,833, and many others. Generally, these processes have in common the steps of employing a normally insulating photoconductive element which is prepared to respond to imagewise exposure with electromagnetic radiation by forming a latent electrostatic charge image. The electrostatic latent image is then rendered visible by a development step in which the charged surface of the photoconductive element is brought into contact with a suitable developer mix.

One method for applying the developer mix is by the well-known magnetic brush process. Such a process can utilize apparatus of the type described, for example, in U.S. Pat. No. 2,874,063, and often comprises a non-magnetic rotatably mounted cylinder having fixed magnetic means mounted inside. The cylinder is arranged to rotate so that part of the surface is immersed in or otherwise contacted with a supply of developer mix. The granular mass comprising the developer mix is magnetically attracted to the surface of the cylinder. As the developer mix comes within the influence of the field generated by the magnetic means within the cylinder, the particles thereof arrange themselves in bristle-like formations resembling a brush. The bristle formations of developer mix tend to conform to the lines of magnetic flux, standing erect in the vicinity of the poles and lying substantially flat when said mix is outside the environment of the magnetic poles. Within one revolution the continually rotating tube picks up developer mix from a supply source and returns part or all of this material to the supply. This mode of operation assures that fresh mix is always available to the copy sheet surface at its point of contact with the brush. In a typical rotational cycle, the roller performs the successive steps of developer-mix pickup, brush formation, brush contact with the photoconductive element, brush collapse and finally mix release.

In magnetic-brush development of electrostatic images, the developer is commonly a triboelectric mixture of fine toner powder comprised of dyed or pigmented thermoplastic resin with coarser carrier particles of a soft magnetic material such as "ground chemical iron" (iron filings), reduced oxide particles, or the like. The conductivity of the ferromagnetic carrier particles which form the "bristles" of a magnetic brush gives some advantage over other modes of development. The conductivity of the ferromagnetic fibers or bristles provides the effect of a development electrode having a very close spacing to the surface of the electrophotographic element being developed. By virtue of this development electrode effect, it is to some extent possible to develop part of the tones in pictures and solid blacks as well as line copy. This ability to obtain solid area development with magnetic brush developing makes this mode of developing advantageous where it is desired to copy materials other than simple line copy.

However, most currently available ferromagnetic carrier particles have an electrical resistance which is too high to produce good quality solid arc development. The various commercial carrier particles generally lack adequate conductivity because of the presence of an insulating surface layer of iron oxide, grease or other contaminants. Efforts to remove such surface contaminants often result in particles which have an even higher electrical resistivity. For example, washing or solvent treatment of iron carrier particles in an effort to remove contaminants merely exposes the surface of the underlying iron to aerial oxidation. The new layer of oxide often has far greater resistivity than the original contaminants. Such an oxide coating can be removed; however, special after-treatment and precaution in storage and handling are required in order to avoid any further oxidation.

Electrostatographic carrier surfaces and carrier particles are generally made from or coated with materials having appropriate triboelectric properties as well as certain other physical characteristics. However, the carrier substrate as well as the surface thereof should not be comprised of materials which are so brittle as to cause either flaking of the surface or particle breakup under the forces exerted on the carrier during recycle. The flaking thereof causes undesirable effects in that the relatively small flaked particles will eventually be transferred to the copy surface thereby interfering with the deposited toner and causing imperfections in the copy image. Furthermore, flaking of the carrier surface will cause the resultant carrier to have non-uniform triboelectric properties when the carrier is composed of a material different from the surface coating thereon. This results in undesirable non-uniform pickup of toner by the carrier and non-uniform deposition of toner on the image. In addition, when the carrier particle size is reduced, the removal of the resultant small particles from the photoconductive plate becomes increasingly difficult. Thus, the types of materials useful for making carrier or for coating carrier, although having the appropriate triboelectric properties, are limited because other physical properties which they possess may cause the undesirable results discussed above.

Thus, there is a continuing need for a better developer material for developing electrostatic latent images.

SUMMARY OF THE INVENTION

It is, therefore, an object of this invention to provide developer materials which overcome the above-noted deficiencies.

It is another object of this invention to provide a method for manufacturing electrostatographic carrier particles and the resulting products which overcome the above-noted deficiencies.

It is another object of this invention to provide a method for manufacturing electrostatographic carrier particles having improved magnetic and electrical properties.

It is another object of this invention to provide a method for manufacturing electrostatographic carrier particles having improved triboelectric properties.

It is a still further object of this invention to render suitable as electrostatographic carrier particles materials which were heretofore unsuitable as carrier materials.

It is a still further object of this invention to provide improved developer materials having physical and chemical properties superior to those of known developer materials.

The above objects and others are accomplished, generally speaking, by introducing low cost magnetic ore particles to a plasma flame heating device in the presence of at least one gas, melting and spheroidizing the ore particles in a closed chamber having a controlled atmosphere wherein the ore droplets are allowed to fall by gravity and cool, and collecting the droplets. More particularly, the process of this invention comprises placing magnetic ore particles having an average particle diameter from between about 5 microns and about 600 microns in a powder feeder, feeding the ore particles to a plasma flame in the presence of at least one gas having good heat transfer properties where the ore particles are melted, allowing molten droplets of the ore particles to fall by gravity in a substantially closed chamber having a controlled gaseous atmosphere wherein the molten droplets spheroidize and cool, and collecting the spheroid solid particles.

In a preferred form, the inventive concept utilizes a carbon arc plasma flame furnace having a 400 kw arc head with one cathode and three carbon anodes whereby temperatures of up to about 10,000° K. are attained. The plasma flame furnace is positioned atop a jacketed chamber having a diameter of about 36 inches and a height of about 22 feet. The high gravity drop assures solidification of each spheroidized particle. The region where the carbon arc plasma flame is formed between the cathode and the anodes is termed the arc region and provides a flame operating in a downward direction. The chamber wherein the heating process occurs is substantially sealed and is initially purged with inert gas. In addition, the plasma flame assembly including the cathode head and the spheroidization chamber are cooled with water jackets.

The foregoing objects, brief description, advantages, and features of the present invention will become more apparent from the following more detailed description and appended drawings wherein:

FIG. 1 is a generalized schematic diagram of the common arc plasma flame assembly and the spheroidization column; and, FIG. 2 illustrates the internal operation of the carbon arc plasma flame assembly.

Referring to the general assembly schematic in FIG. 1, the spheroidization column 10 is fitted with a carbon arc plasma flame assembly 12. The spheroidization column and more specifically the plasma flame assembly is provided with powder feeder 14 including feeder tubes 16 having feed ports for directing the ore to the arc region. The spheroidization column is typically from between about 10 feet and about 30 feet in height and is fitted with a water jacket 18 and an exhaust outlet 20 leading to a dry cyclone collection chamber 22 fitted with bag filters 24. In addition, the spheroidization column is connected with a purge system indicated as inlet conduit 28 providing an internal flow of nitrogen to the spheroidization column. The purged effluent exits the spheroidization column via exhaust outlet 20. After spheroidization and cooling of the ore particles inside the spheroidization column, the resultant product is recovered as beads via the output conduit 30 from the lower portion of the spheroidization column. The beads thus provided may be discharged into a drying unit 32 when the molten droplets are cooled with a water bath at the bottom of the spheroidization chamber. A screening unit 34 may serve the functions of classifying particles in accordance with a desired mesh size, and placing the desired particles in the receptacle 36 and the undesired particles in the scrap unit 38.

Referring now to FIG. 2, the interior of the carbon arc plasma flame assembly is shown in greater detail. The ore particles are introduced to the plasma flame assembly via feeder ports 17 from ore feeder tubes 16 along with an inert non-oxidizing carrier gas such as nitrogen by means of a high pressure supply or the like, shown in FIG. 1. Cathode 19 is connected to a DC power supply system, not shown. In addition, Cathode 19 is provided with a source of argon gas fed through lines 21 by means of a high pressure supply or the like, not shown. Carbon anodes 23 are mounted above the insulating upper surface of the spheroidization column and are positioned perpendicular to the cathode. The anodes are fed, along with nitrogen gas which acts as a seal at the anode port to the arc region as to maintain the desired electrical potential between each anode and the cathode. Cathode 19 in cooperation with carbon anodes 23 provide the electrical arcs which ionize the feed gases to form plasma flame 25. A controlled amount of oxygen gas is fed to plasma flame 25 via port 27.

In operation, powder feeder 14 is loaded with magnetic ore particles of the approximate desired particle size. Cathode 19 and carbon anodes 23 are energized by an electrical power source and in cooperation with the feed gases provide plasma flame 25. The ore particles are fed via feeder tubes 16 to the common arc plasma flame in the presence of an inert non-oxidizing carrier gas. It has been found that feeding the ore particles in the presence of nitrogen gas provides good heat transfer to the ore particles during processing thereby improving the efficiency of the process. Other gases which have good heat transfer properties may also be used for this purpose.

Due to the extreme heat generated in the plasma arc region, the ore particles passing therethrough become melted globules. As the melted globules fall by gravity into the spheroidization chamber, the globules spheroidize, cool, and collect at the bottom of the spheroidization chamber. The proper conditions for the plasma flame are created by adjusting the flow rate of the ore particles, the flow rate of the feed gases, and the voltage and current of the cathode and of the anodes.

The plurality of particles thus formed, indicated generally as 44, fall away from the arc region of the plasma flame as droplets and down to the bottom of the spheroidization chamber to collect near output conduit 30. As they fall, the droplets are cooled and solidify in spherical form. The collecting area serves also to cool as well as collect the spheroidized particles. From the collecting area, the particles are discharged through output conduit 30 by gravity, an auger feed, or other suitable means for removal. The particles are introduced to screening unit 34 for classification and ultimate use as electrostatographic carrier particles.

To further improve the characteristics of the spheroid particles thus formed, an exhaust system is utilized as indicated at outlet 20. The exhaust system has been found beneficial in removing dust and fines from the spheroidization column and avoids their settling on and otherwise contaminating the spheroidized particles. The dust and fines thereby removed from the spheroidization chamber are passed through cyclone collector chamber 22 and collected for removal by bag filters 24. Element 20 is provided with a suitable means (now shown) such as a back pressure valve or the like which will allow release of gases while maintaining a sufficiently high positive pressure in the column resulting from the continuous feeding of the gases into the chamber. In this manner the spheroidization column may continuously be vented without the fear of backwash resulting in contamination from air or the like.

The spheroidization column is of sufficient height and diameter to permit the molten droplets to assume their spheroidal shape before striking the output conduit. It has been found experimentally that good results are obtained in a column having a 36 inch internal diameter and a 22 foot height. However, it has been found that satisfactory results with varying yields may be obtained from a height ranging from about 5 to about 10 feet, and it is estimated that a diameter of about 2 feet or greater will suffice.

It is preferred that the spheroidization column wall be jacketed with suitable interwall circulation of coolants or the like to provide cooling for the chamber walls, the molten droplets, and to provide further insurance against agglomeration of the spheroid particles.

The factors generally affecting the process yield and product quality include, in order of relative importance, the amount of the oxidizing gas, the amount of inert, non-oxidizing gas, current flow, ore particle trajectory and feed rate, and the exhaust system. As noted above, the inert gas should be non-oxidizing or at least substantially non-oxidizing and should be inert with respect to the materials utilized to form the particles. It has been found that nitrogen is a suitable gas for this purpose, and is preferred. However, it is also possible to employ argon, helium, carbon dioxide, or combinations of these or other inert, non-oxidizing gas. It has further been found that the presence of an oxidizing gas, with oxygen being preferred, is necessary at the plasma flame to obtain spheroidized particles having the desired magnetic moment for use as magnetic electrostatographic carrier beads. Thus, the presence of between about 10 percent and about 20 percent of oxygen at the plasma flame has been found to provide the aforementioned desired property to the beads. It has been found that magnetic ore particles processed in accordance with this invention will provide carrier beads having an average saturation magnetic moment of between about 50 and about 85 electromagnetic units per gram which results in satisfactory performance when they are used in magnetic electrostatographic development systems. However, carrier beads having an average saturation magnetic moment of at least about 70 electromagnetic units per gram are preferred because carrier beads having low magnetic moments have been found to result in carrier bead carry-over to the recording surfaces. As more fully shown in the working examples, the magnetic moment of magnetic ore particles may be varied depending upon the process conditions, and in particular, upon the amount of oxidizing gas present.

It is also highly desirable to reduce the formation of dust, e.g., particles having an average diameter of less than about two microns. This may be accomplished by initially employing larger ore particle sizes and by preventing the introduction of "fines" or very small particles into the plasma flame.

In the spheroidization process, employing a nominal 400 kw plasma arc unit, it has been found that acceptable results providing yields significantly higher than obtainable with prior art processes, are achieved with an inert gas flow rate ranging between about 700 and about 800 standard cubic feet per hour, an oxidizing gas flow rate ranging between about 100 and about 200 standard cubic feet per hour, and an electrical current flow of between about 650 and about 750 amperes between each anode and the cathode. The ore particle feed rate may vary between about 100 to about 400 pounds per hour.

Various sources of magnetic ore particles may be employed to produce other metallic or pseudo-alloy core materials. Typical ore sources include magnetite, hematite, taconite, ilmenite, and the like. In addition, it is preferred to screen the raw ore particles prior to their processing in accordance with this invention. Screening or classification of the raw ore particles will provide ore material having better controlled particle sizes wherein after processing, the beads will be of more uniform size. In addition, where magnetic beads are desired, it is advantageous to magnetically separate the magnetic ore from non-magnetic fractions prior to processing.

The low cost magnetic ore carrier materials processed in accordance with this invention may be coated with any suitable coating material. Typical electrostatographic carrier particle coating materials include vinyl chloride-vinyl acetate copolymers, poly-p-xylylene polymers, styrene-acrylate-organosilicon terpolymers, natural resins such as caoutchouc, colophony, copal, dammar, Dragon's Blood, jalap, storax; thermoplastic resins including the polyolefins such as polyethylene, polypropylene, chlorinated polyethylene, and chlorosulfonated polyethylene; polyvinyls and polyvinylidenes such as polystyrene, polymethylstyrene, polymethyl methacrylate, polyacrylonitrile, polyvinyl acetate, polyvinyl alcohol, polyvinyl butyral, polyvinyl chloride, polyvinyl carbazole, polyvinyl ethers, and polyvinyl ketones; fluorocarbons such as polytetrafluoroethylene, polyvinyl fluoride, polyvinylidene fluoride; and polychlorotrifluoroethylene; polyamides such as polycaprolactam and polyhexamethylene adipamide; polyesters such as polyethylene terephthalate; polyurethanes; polysulfides, polycarbonates; thermosetting resins including phenolic resins such as phenol-formaldehyde, phenolfurfural and resorcinol formaldehyde; amino resins such as urea-formaldehyde and melamineformaldehyde; polyester resins; epoxy resins; and the like.

Many of the foregoing and other typical carrier coating materials are described by L. E. Walkup in U.S. Pat. No. 2,618,551; B. B. Jacknow et al U.S. Pat. No. 3,526,533; and R. J. Hagenbach et al in U.S. Pat. Nos. 3,533,835 and 3,658,500. When the magnetic carrier particles of this invention are coated, any suitable electrostatographic carrier coating thickness may be employed. However, a carrier coating having a thickness at least sufficient to form a thin continuous film on the carrier particle is preferred because the carrier coating will then possess sufficient thickness to resist abrasion and prevent pinholes which adversely affect the triboelectric properties of the coated carrier particles. Generally, for cascade and magnetic brush development, the carrier coating may comprise from about 0.1 percent to about 10.0 percent by weight based on the weight of the coated composite carrier particles. Preferably, the carrier coating should comprise from about 0.1 percent to about 1.0 percent by weight based on the weight of the coated carrier particles because maximum durability, toner impaction resistance, and copy quality are achieved. To achieve further variation in the properties of the coated magnetic carrier particles, well-known additives such as plasticizers, reactive and non-reactive polymers, dyes, pigments, wetting agents and mixtures thereof may be mixed with the coating materials. An ultimate coated or uncoated carrier particle having an average diameter between about 30 microns and about 600 microns is preferred in development systems because the carrier particle then possesses sufficient density and inertia to avoid adherence to the electrostatic image during the development process. Adherence of carrier particles to an electrostatographic drum is undesirable because of the formation of deep scratches on the drum surface during the image transfer and drum cleaning steps, particularly where cleaning is accomplished by a web cleaner such as the web disclosed by W. P. Graff, Jr., et al in U.S. Pat. No. 3,186,838.

Any suitable well-known toner material may be employed with the magnetic carriers of this invention. Typical toner materials include gum copal, gum sandarac, rosin, cumaroneindene resin, asphaltum, gilsonite, phenolformaldehyde resins, rosin modified phenolformaldehyde resins, methacrylic resins, polystyrene resins, polypropylene resins, epoxy resins, polyethylene resins, polyester resins, and mixtures thereof. The particular toner material to be employed obviously depends upon the separation of the toner particles from the magnetic carrier in the triboelectric series and should be sufficient to cause the toner particles to electrostatically cling to the carrier surface. Among the patents describing electroscopic toner compositions are U.S. Pat. No. 2,659,670 to Copley; U.S. Pat. No. 2,753,308 to Landrigan; U.S. Pat. No. 3,079,342 to Insalaco; U.S. Pat. Reissue No. 25,136 to Carlson and U.S. Pat. No. 2,788,288 to Rheinfrank et al. These toners generally have an average particle diameter between about 1 and 30 microns.

Any suitable colorant such as a pigment or dye may be employed to color the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Ozalate, lampblack, Rose Bengal, Monastral Red, Sudan Black BM, and mixtures thereof. The pigment or dye should be present in the toner in a quantity sufficient to render it highly colored so that it will form a clearly visible image on a recording member. Preferably, the pigment is employed in an amount from about 3 percent to about 20 percent, by weight, based on the total weight of the colored toner because high quality images are obtained. If the toner colorant employed is a dye, substantially smaller toner concentration may be employed with the magnetic carriers of this invention. Typical toner concentrations for electrostatographic development systems include about 1 part toner with about 10 to about 200 parts by weight of carrier.

Any suitable organic or inorganic photoconductive material may be employed as the recording surface with the magnetic carriers of this invention. Typical inorganic photoconductor materials include: sulfur, selenium, zinc sulfide, zinc oxide, zinc cadmium sulfide, zinc magnesium oxide, cadmium selenide, zinc silicate, calcium strontium sulfide, cadmium sulfide, mercuric iodide, mercuric oxide, mercuric sulfide, indium trisulfide, gallium selenide, arsenic disulfide, arsenic trisulfide, arsenic triselenide, antimony trisulfide, cadmium sulfo-selenide, and mixtures thereof. Typical organic photoconductors include: quinacridone pigments, phthalocyanine pigments, triphenylamine, 2,4-bis(4,4'-diethyl-amino-phenol)-1,3,4-oxadiazol, N-isopropyl-carbazol, triphenyl-pyrrol, 4,5-diphenylimidazolidinone, 4,5-diphenylimidazolidinethione, 4,5-bis(4'-amino-phenyl)-imidazolidinone, 1,5-dicyanonaphthalene, 1,4-dicyanonaphthalene, aminophthalodinitrile, nitrophthalodinitrile, 1,2,5,6-tetraazacyclooctatetraene-(2,4,6,8), 2-mercaptobenzothiazole-2-phenyl-4-diphenylideneoxazolone, 6-hydroxy-2,3-di(p-methoxyphenyl)-benzofurane, 4-dimethylamino-benzylidene-benzhydrazide, 3-benzylidene-aminocarbazole, polyvinyl carbazole, (2-nitro-benzylidene)-p-bromoaniline, 2,4-diphenyl-quinazoline, 1,2,4-triazine, 1,5-diphenyl-3-methyl-pyrazoline, 2-(4'-dimethylamino phenyl)-benzoxazole, 3-amine-carbazole, and mixtures thereof. Representative patents in which photoconductive materials are disclosed include U.S. Pat. Nos. 2,803,542 to Ullrich, U.S. Pat. No. 2,970,906 to Bixby, U.S. Pat. No. 3,121,006 to Middleton, U.S. Pat. No. 3,121,007 to Middleton, and U.S. Pat. No. 3,151,982 to Corrsin.

The surprisingly better results obtained with the electrostatographic low cost magnetic carriers of this invention may be due to many factors. For example, the spheroidized carriers of this invention possess smooth outer surfaces which are highly resistant to cracking, chipping, and flaking. In electrostatographic development systems, the spherical surface enhances the triboelectric action of the carrier particles across the electrostatographic surfaces and reduces the tendency of carrier particles to adhere to electrostatographic imaging surfaces. When these carriers are employed in electrostatographic development systems, carrier life is unexpectedly extended particularly with respect to toner impaction resistance. Additionally, the carriers of this invention provide more uniform triboelectric characteristics than current carriers when employed in electrostatographic development systems. Further, the carriers of this invention provide exceptionally good life performance, durability, copy quality, quality maintenance, less carrier bead sticking and agglomeration, and also provide economical carrier materials thereby minimizing the cost of electrostatographic developer materials. Thus, the magnetic carrier particles of this invention have desirable properties which permit their wide use in presently available electrostatographic systems.

The following examples, other than the control examples, further define, describe and compare preferred methods of preparing and utilizing the magnetic carriers of the present invention in electrostatographic applications. Parts and percentages are by weight unless otherwise indicated.

EXAMPLE I

Employing the apparatus described in FIG. 1 and FIG. 2, nominal 100 micron magnetite ore particles were placed in the powder feeder. The ore particles were fed to the plasma flame at the rate of about 300 pounds/hour. Nitrogen gas was fed with the ore particles at the rate of about 230 standard cubic feet per hour. In addition, argon gas was fed around the cathode at the rate of about 230 standard cubic feet per hour. The carbon arc plasma flame furnace arc head was provided with about 215 kw providing about 650 amperes between each of the three carbon anodes and the cathode.

As the ore particles were injected into the plasma flame they became molten droplets. As the molten droplets fell by gravity in the spheroidization column, they cooled and spheroidized. The inside chamber of the spheroidization column was provided with a controlled atmosphere having been fed nitrogen gas at the rate of about 290 standard cubic feet per hour via the anode ports. After processing of the particles, the beads were collected from the bottom of the chamber via output conduit 30 and classified.

Processed beads classified to 100 micron nominal particle size were then coated with about 0.63 percent by weight, based on the weight of the beads, of a coating material comprising styrene-methacrylate ester-organosilicon terpolymer as described in U.S. Pat. No. 3,467,634. A developer mixture was prepared comprising about 99 parts of the thus coated beads and about 1 part of toner particles as described in U.S. Pat. No. 3,079,342. The developer mixture was employed in a magnetic brush electrostatographic system for the development of electrostatic latent images. However, it was found that the developer mixture was unsatisfactory in that it did not form a magnetic brush. The problem was found to be due to the very low magnetic moment of the carrier beads which was only about 21 electromagnetic units per gram.

EXAMPLE II

Employing the apparatus described in FIG. 1 and FIG. 2, nominal 100 micron magnetite ore particles were placed in the powder feeder. The ore particles were fed to the plasma flame at the rate of about 300 pounds/hour. Nitrogen gas was fed with the ore particles at the rate of about 230 standard cubic feet per hour. Oxygen gas was fed to the plasma at the rate of about 140 standard cubic feet per hour. In addition, argon gas was fed around the cathode at the rate of about 230 standard cubic feet per hour. The presence of argon gas around the cathode has been generally found to improve its useful lifetime. The carbon arc plasma flame furnace arc head was provided with about 245 kw providing about 680 amperes between each of the three carbon anodes and the cathode.

As the ore particles were injected into the plasma flame they became molten droplets. As the molten droplets fell by gravity in the spheroidization column, they cooled and spheroidized. The inside chamber of the spheroidization column was provided with a controlled atmosphere having been fed with about 290 standard cubic feet per hour of nitrogen gas via the anode ports. After processing of the ore particles, the beads were then collected from the bottom of the chamber via output conduit 30 and classified.

Processed beads classified to 100 micron nominal particle size were then coated with about 0.62 percent by weight, based on the weight of the beads, of a coating material comprising styrene-methacrylate ester-organosilicon terpolymer as described in U.S. Pat. No. 3,467,634. A developer mixture was prepared comprising about 99 parts of the thus coated beads and about 1 part of toner particles as described in U.S. Pat. No. 3,079,342. The developer mixture was employed in a magnetic brush electrostatographic system for the development of electrostatic latent images. It was found that the developer mixture formed an excellent magnetic brush and provided satisfactory reproductions of latent images with high image densities and low background levels up to about 200,000 copies. The magnetic moment of the carrier beads was found to be about 72 electromagnetic units per gram. In addition, the uncoated carrier beads were found to have a substantially uniform density indicating reliability of the process and low oxide contamination.

EXAMPLE III

Employing the apparatus described in FIG. 1 and FIG. 2, nominal 100 micron magnetic ore particles were placed in the powder feeder. The ore particles were fed to the plasma flame at the rate of about 300 pounds/hour. Nitrogen gas was fed with the ore particles at the rate of about 230 standard cubic feet per hour. Oxygen gas was fed to the plasma flame at the rate of about 80 standard cubic feet per hour. In addition, argon gas was fed around the cathode at the rate of about 230 standard cubic feet per hour. The carbon arc plasma flame furnace arc head was provided with about 245 kw providing about 600 amperes between each of the three carbon anodes and the cathode.

As the ore particles were injected into the plasma flame they became molten droplets. As the molten droplets fell by gravity in the spheroidization column, they cooled and spheroidized. The inside chamber of the spheroidization column was provided with a controlled atmosphere having been fed with about 290 standard cubic feet per hour of nitrogen gas via the anode ports. After processing of the ore particles, the beads were then collected from the bottom of the chamber via output conduit 30 and classified.

Processed beads classified to 100 micron nominal particle size were then coated with about 0.62 percent by weight, based on the weight of the beads, of a coating material comprising styrene-methacrylate ester-organosilicon terpolymer as described in U.S. Pat. No. 3,467,634. A developer mixture was prepared comprising about 99 parts of the thus coated beads and about 1 part of toner particles as described in U.S. Pat. No. 3,079,342. The developer mixture was employed in a magnetic brush electrostatographic system for the development of electrostatic latent images. It was found that the developer mixture formed an excellent magnetic brush and provided satisfactory reproductions of latent images up to about 260,000 copies. The magnetic moment of the carrier beads was found to be about 57 electromagnetic units per gram.

The particular configuration of the carbon arc plasma flame assembly is intended as exemplary only and is not intended to be limiting.

While the invention has been described with reference to specific preferred embodiments, it will be apparent to those skilled in the art that various substitutions, alterations and modifications may be made therein without departing from the spirit and scope of the invention. Such substitutions, alterations and modifications are intended to be within the scope of this invention.

What is claimed is:

1. A method of manufacturing spheroidized electrostatographic magnetic carrier beads comprising the steps of providing a substantially closed spheroidization column, purging said spheroidization column with nitrogen, providing said spheroidization column with a carbon arc plasma flame assembly comprising a 400 kw arc head with one cathode and three carbon anodes, energizing said arc head with a DC power supply to provide an electrical current flow of between about 650 and 750 amperes between said cathode and each of said anodes, providing a supply of argon gas to said cathode and a supply of nitrogen gas to said anodes to form a plasma flame having temperatures of up to about 10,000° K, providing a supply of oxygen to said plasma flame at a flow rate of between about 100 and about 200 standard cubic feet per hour, feeding to said plasma flame magnetic raw ore particles selected from the group consisting of magnetite, hematite, taconite, and ilmenite wherein said ore particles have an average particle diameter of from between about 5 microns and about 600 microns and are fed to said plasma flame in the presence of nitrogen carrier gas for said ore particles whereby said ore particles are at least partially melted to form globules thereof, and allowing said globules to fall by gravity in said spheroidization chamber wherein said globules cool and solidify into spheroidized particles having an average saturation magnetic moment of between about 50 and about 85 electromagnetic units per gram.

2. A method of manufacturing spheroidized electrostatographic magnetic carrier beads in accordance with claim 1 wherein the flow rate of said nitrogen carrier gas is from between about 700 and about 800 standard cubic feet per hour.

3. A method of manufacturing spheroidized electrostatographic magnetic carrier beads in accordance with claim 1 wherein said ore particles are fed to said plasma flame at a feed rate of between about 100 and 400 pounds per hour.

4. A method of manufacturing spheriodized electrostatographic magnetic carrier beads in accordance with claim 1 including screening said ore particles prior to feeding said ore particles to said plasma flame so as to remove ore particles therefrom having an average diameter of less than about 2 microns.

5. A method of manufacturing spheroidized electrostatographic magnetic carrier beads in accordance with claim 1 including providing an exhaust system to said spheroidization column to remove dust and fines therefrom during the spheroidization of said magnetic raw ore particles.

6. A method of manufacturing spheroidized magnetic electrostatographic carrier beads comprising the steps of screening magnetic raw ore particles, selected from the group consisting of magnetite, hematite, taconite, and ilmenite so that said raw ore particles have an average particle diameter of from between about 5 microns and about 600 microns, providing a substantially closed spheroidization chamber, purging said spheroidization column with nitrogen, providing said spheroidization chamber with a carbon arc plasma flame assembly, comprising a 400 kw arc head with one cathode and three cathode anodes, energizing said arc head with a DC power supply to provide an electrical current flow of between about 650 and 750 amperes between said cathode and each of said anodes, providing a supply of argon gas to said cathode and a supply of nitrogen gas to said anodes to form a plasma flame having temperatures of up to about 10,000° K, providing a supply of oxygen in the amount of from between about 100 and about 200 standard cubic feet per hour to said plasma flame, feeding said raw ore particles to said plasma flame in the presence of nitrogen carrier gas for said ore particles whereby said ore particles are at least partially melted to form droplets thereof, and allowing said droplets to fall by gravity in said spheroidization chamber wherein said droplets cool and solidify into spheroidized particles having an average saturation magnetic moment of between about 50 and about 85 electromagnetic units per gram.

7. A method of manufacturing spheroidized magnetic electrostatographic carrier beads in accordance with claim 6 including coating said spheroidized particles with an insulating resinous material and mixing about 10 parts to about 200 parts of the coated spheroidized particles with about 1 part by weight of finely-divided toner material.

8. A method of manufacturing spheroidized magnetic electrostatographic carrier beads in accordance with claim 6 wherein said ore particles are fed to said plasma flame at the rate of about 300 pounds per hour, said nitrogen carrier gas is fed at the rate of about 230 standard cubic feet per hour, and said argon gas is fed to said cathode at the rate of about 230 standard cubic feet per hour.

* * * * *